Sept. 8, 1936.    R. C. RUSSELL    2,053,301
STEERING APPARATUS
Filed Dec. 14, 1931    5 Sheets-Sheet 5
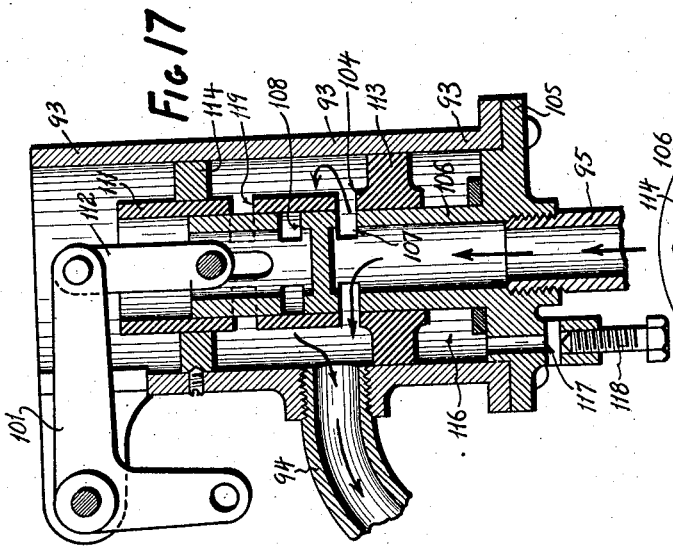
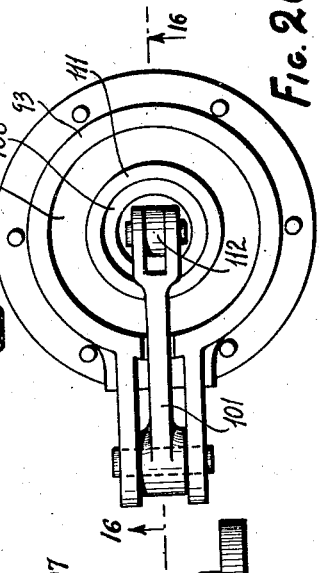
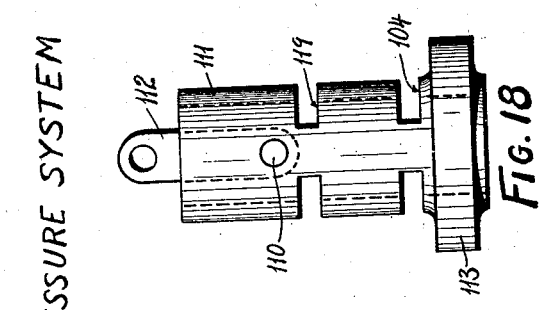
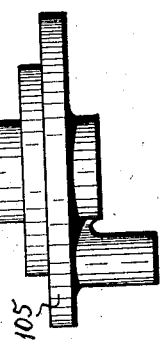
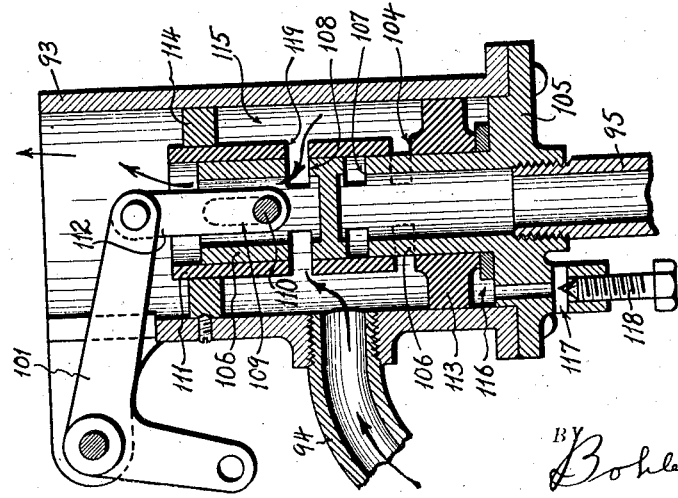
INVENTOR
Robert C. Russell
BY Bohleber + Ledbetter
ATTORNEYS Patented Sept. 8, 1936

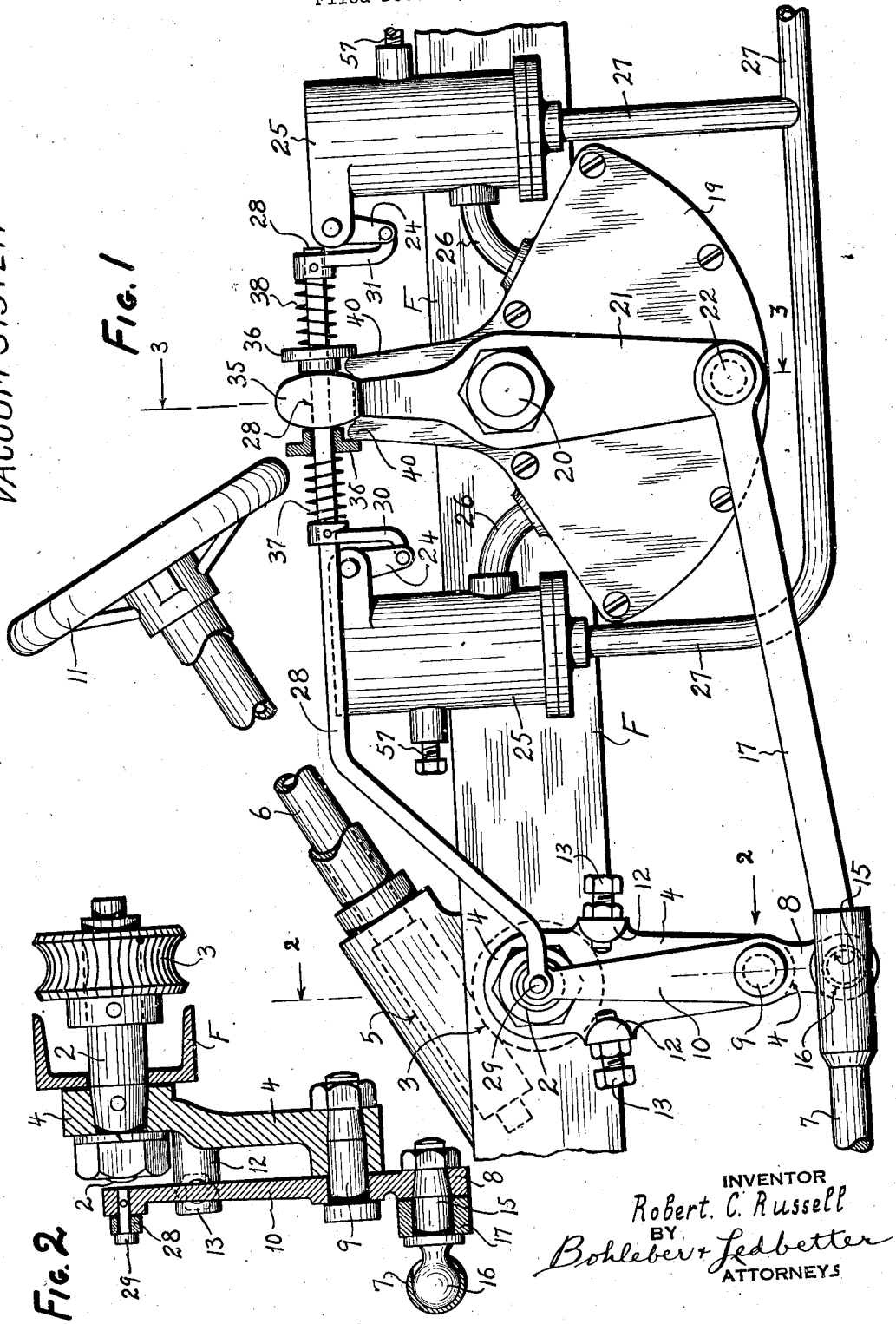

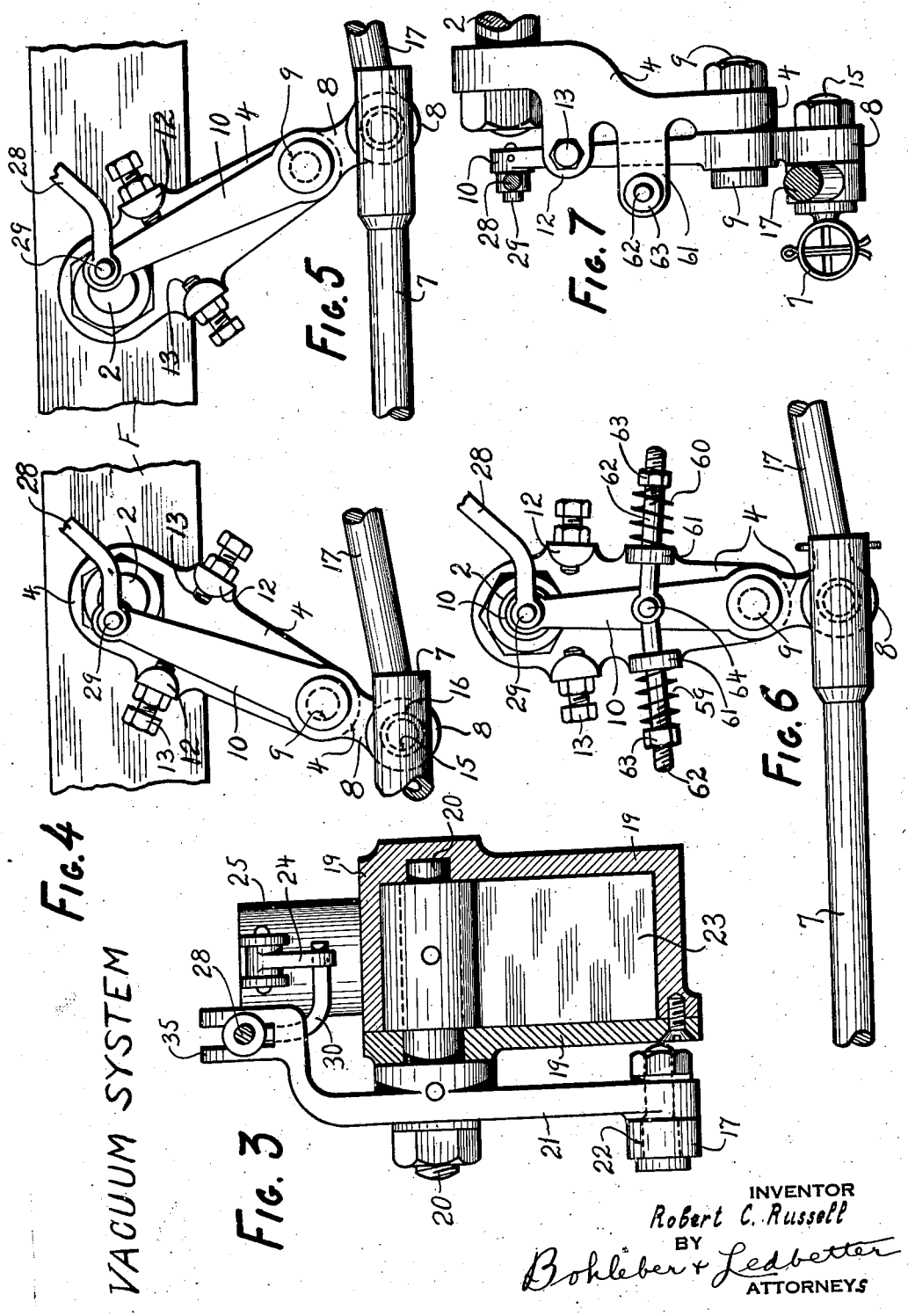

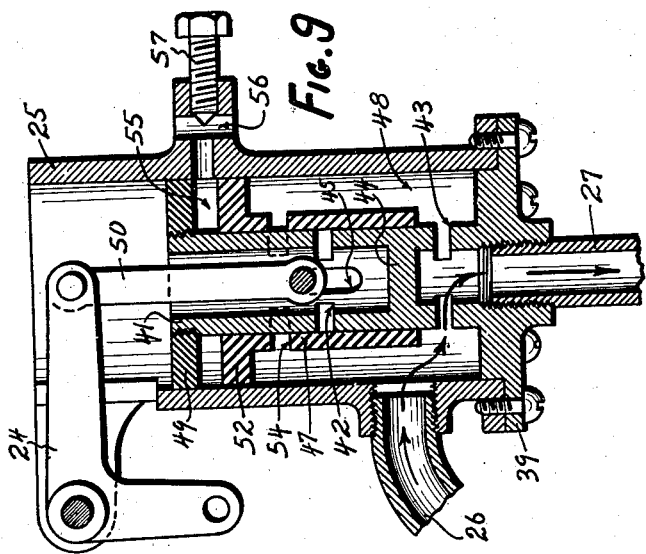
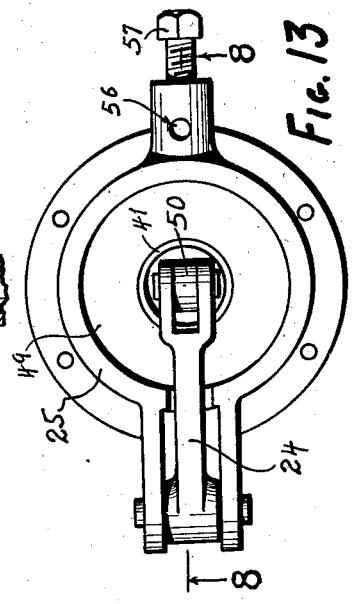
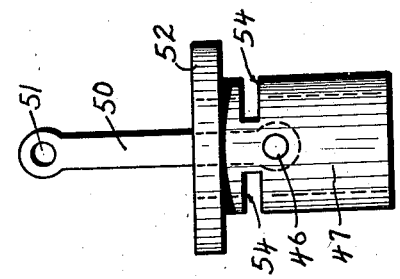
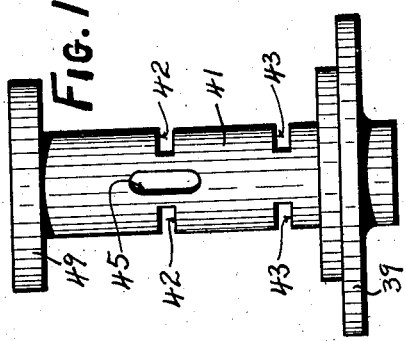
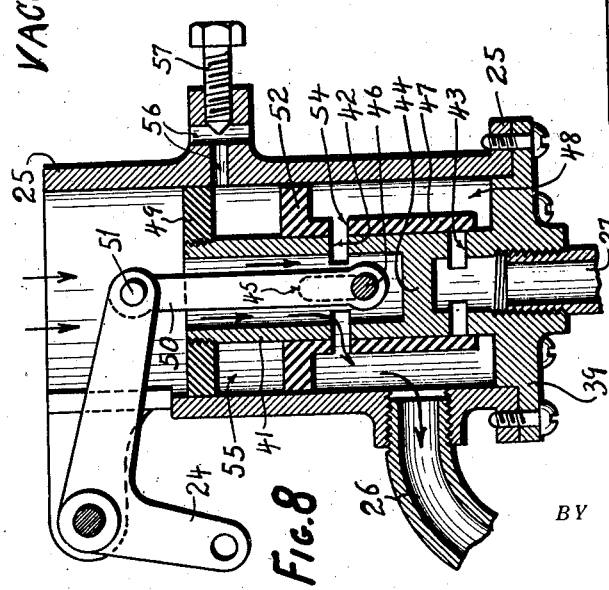
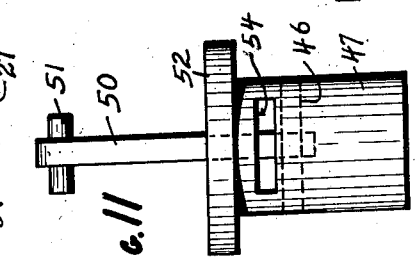

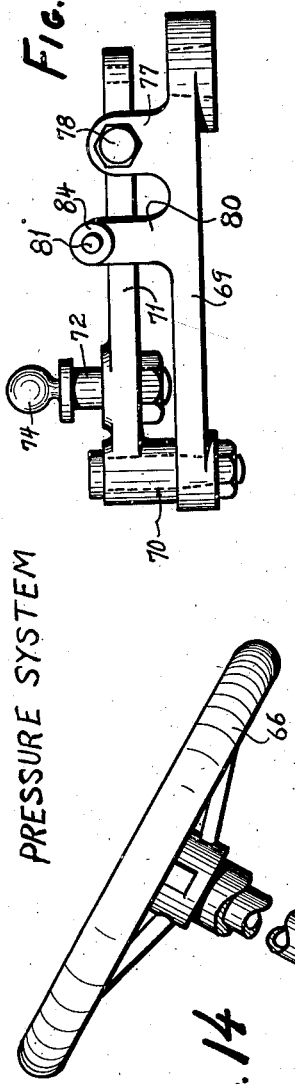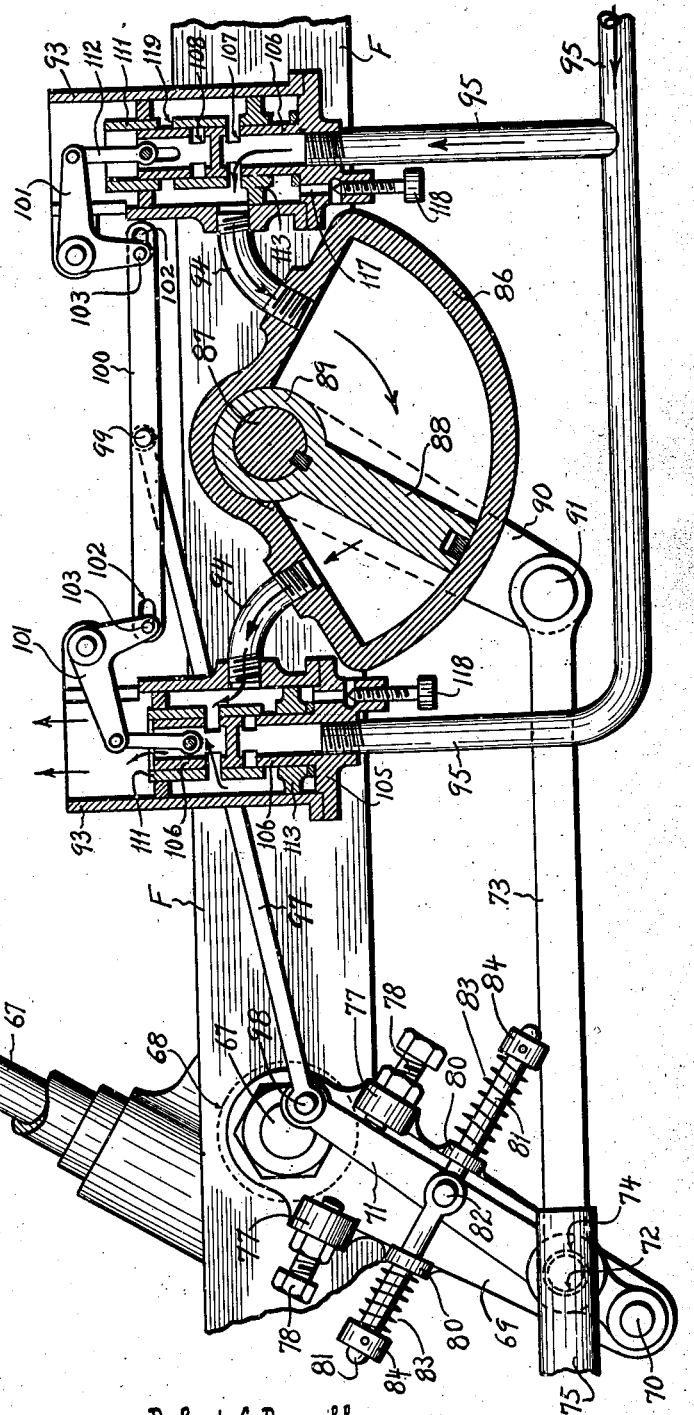

2,053,301

UNITED STATES PATENT OFFICE 2,053,301

STEERING APPARATUS

Robert C. Russell, Dallas, Tex., assignor, by mesne assignments, to Bendix-Westinghouse Automotive Air Brake Company, Pittsburgh, Pa., a corporation of Delaware Application December 14, 1931, Serial No. 580,841

16 Claims. (Cl. 180—79.2)

This invention relates to power or servo-motor steering means for automotive vehicles and the like, such as automobiles, busses and trucks to relieve fatigue and provide an accurate and quick steering control.

Among other things, it is an object of this invention, in grasping the problems of steering by power, to provide means whereby the driver may retain the sense and feel of his manual-steering effort to which he has been long accustomed and to provide a responsive and sensitive power steering mechanism.

Another object is to produce a servo-motor control, novel in respect to either fluid pressure or suction operation, and to provide therefor in either case a motive-fluid control valve having sensitive feeling means which informs the driver of the degree of steering effort being exerted by the servo motor under the manual guidance or control of the driver.

A further object is to produce a new servo motor construction and valve control means therefor and which are suitable for use as a part of the general combination constituting this invention.

It is also a purpose to produce improvements in an automotive steering mechanism which shall function to automatically return the vehicle steering element, such as the guiding or dirigible ground wheels of an automobile, to normal straight-line travel when the driver releases the manual-steering wheel after he has executed a turn of said ground wheels.

A further object is to produce a vehicle steering system wherein is combined a manual and power means of such character that the driver has full manual control of the vehicle in event the power system should fail and in this respect to provide adjustable means to lock out the servo motor so the latter will not interfere with manual steering.

Other objects of the invention are inherent in the construction disclosed; and concrete examples, which may be altered in form and operation without departing from the spirit of the invention, are shown in the accompanying drawings. The negative and positive fluid-pressure feature is designated on the drawings for the convenience of the reader so one may readily note whether the view in question appertains to pressure or suction means.

*Views showing suction operated steering system*

The views designated Figures 1 thru 13 show an example of my invention adapted to a vacuum or suction operated steering system.

Figure 1 illustrates a side assembly view of a vehicle frame, with an example of a suction operated power steering means installed thereon in accordance with this invention. The position of the parts are shown in neutral or normal position as when the vehicle is traveling straight ahead. This form of the invention provides automatic control means to return the servo-motor means, and hence the vehicle if equipped with reversible steering gear means, to straight-line travel in event the driver releases the steering wheel while on a turn.

Figure 2 is a cross section on line 2—2 of Figure 1 showing the assembly of the manual steering arm and valve control arm which is an important element in the combination.

Figure 3 is a cross section on the line 3—3 of Figure 1, showing the suction-type servo motor.

Figures 4 and 5 are views of one form of the steering arm assembly in the positions assumed when turning to the left and right, respectively.

Figures 6 and 7 show a modified form of the steering arm assembly having resilient means to either normally hold a valve control arm in neutral position or return it thereto, Figure 6 being a face view thereof, and Figure 7 an edge view. Although shown with the suction apparatus, these two views show a novel arm assembly for use with any suitable servo-motor means.

Figures 8 thru 13 are views of a suction-type motive-fluid control valve for the servo motor means and which embodies manual feeling means to impart a sense of control to the driver.

Figure 8 shows a longitudinal section thru the suction control valve as taken on the line 8—8 of Figure 13. The valve in this view has its suction-outlet port closed against motive-fluid flow from one side of the motor and its atmospheric-inlet port is open, and hence is in the position assumed when the vehicle is headed straight and with the motor deenergized.

Figure 9 shows the same suction valve as Figure 8 but in reverse position, i. e., its suction-outlet port is open to communicate one side of the servo motor with a suction or vacuum producing means such as the intake manifold of an internal combustion engine, and its atmospheric-inlet port is closed.

Figure 10 is a side elevation of a movable sleeve valve element having a pressure feeling piston flange and removed from the valve housing where it reciprocates on the outside of a stationary valve-port tube shown in Figure 12 to open and close a suction-outlet port and atmospheric-inlet port to control the suction applied to one side of the servo motor and air pressure to the other side thereof.

Figure 11 is a view of the same sleeve valve as in Figure 10 but turned ninety degrees.

Figure 12 is a view of a stationary valve-port tube, removed from the valve housing, and provided with suction-outlet ports and atmospheric-inlet ports and over which the sleeve valve of Figures 10 and 11 is slidably mounted.

Figure 13 is a plan view of the complete suction control valve structure shown in Figures 8 and 9 looking down into the top thereof from the atmospheric-inlet end.

*Views showing fluid-pressure operated steering system*

The views designated Figures 14 thru 20 show the invention embodied in a fluid-pressure operated steering system.

Figure 14 shows a longitudinal section side assembly view of the pressure steering means on a vehicle frame. The position of the apparatus is that assumed when steering to the left.

Figure 15 shows an edge view of a manual arm and a valve control arm assembly removed from the frame in Figure 14.

Figures 16 thru 20 show a motive-fluid pressure control valve also having a feeling means the action of which is sensitive to a driver or operator's hands when manipulating a steering wheel.

Figure 16 is a longitudinal section of the pressure control valve as taken on the line 16—16 of Figure 20 and which is employed to control a pressure-operated servo motor. The valve ports are in normal straight-line travel position which means that the exhaust port is open to connect one side of the servo motor to atmosphere and the pressure intake is closed to shut off the flow of pressure to the other side of the servo motor.

Figure 17 shows the same valve as in Figure 16 but in the reverse position so that the exhaust to atmosphere is closed and the intake is open to admit fluid pressure to the servo motor to actuate it in the direction, for example, as shown in Figure 14 to steer to the left.

Figure 18 shows a movable sleeve valve having pressure feeling means and being detached from the valve housing and from the stationary valve-port tube of Figure 19.

Figure 19 shows the valve-port tube removed from the housing and over which the sleeve valve of Figure 18 reciprocates to periodically open and close the exhaust and inlet port which control the flow of motive-fluid pressure to and from the motor.

Figure 20 is a plan view of the fluid-pressure control valve looking down into the exhaust end and out thru which one side of motor exhausts when pressure is applied to its other side.

*Construction of the suction operated steering system*

In the drawings a vehicle or motor car frame is diagrammatically pointed out at F and a conventional steering or rock shaft 2 is journaled in a bearing on the frame and carries a worm wheel 3. An improved manual-steering or primary arm 4 is fixed on and depends from the shaft 2. A worm pinion 5 engages the worm wheel 3 in the usual way and a conventional steering-wheel shaft 6 is fixed to the worm 5. The upper end of the steering-wheel shaft 6 carries a driver's wheel in the form of a manual control or hand-steering wheel 11 and, by manually turning it, a rotary or oscillating motion is imparted to the rock shaft 2 by which to swing forwardly or rearwardly the novel manual steering arm 4 to steer an automobile in the usual way. This main or primary arm 4 is adapted to be operatively connected with a vehicle-guiding means, such as the steerable ground wheels thereof.

On the lower end of the primary or main steering arm 4, it is the usual practice to pivotally connect the rear end of a conventional drag link 10 and the front end of which connects with the usual steering knuckle on the steering arm (not shown) so as to actuate the tie rod or other conventional steering elements of the vehicle-guiding means or ground wheels, for swiveling said wheels in steering a machine in the usual manner. The foregoing elements are in part well known and are used in combination with this invention.

My novel manually-operable arm means 4 constitutes an important feature. A steering or drag link 7 is used in a novel way by pivoting its rear extremity on the lower end 8 of an auxiliary arm or steering lever pivoted at 9 on the lower end of my specially designed primary or main manual-steering arm 4. The upper end 10 of said auxiliary-steering arm or lever 8, 10 acts principally as a valve control arm to open and close a control valve means for a servo motor, and acts secondarily to brace its short lower end 8 against undue movement on the primary arm 4 to transmit the steering effort from the hand control or wheel 11 to drag link 7 in event the servo motor should for any reason fail to respond as well as to transmit the steering force of the servo motor to be described. The steering wheel shaft 6, the gearing 3, 5 with arm 4 and drag link 7, all constitute transmission means for transferring the movement of the steering wheel 11 to the vehicle ground wheels not shown. The drag link 7 is merely representative of any instrumentality to impart a swinging movement to some dirigible or steerable element to be actuated in guiding a vehicle means.

This invention provides improvements in a combination manual and motor-driven steering means for a vehicle so that in event the servo motor means gets out of order, the machine or vehicle is still under the control of the driver. The manual-control arm 4 has a pair of spaced stops 12 shown as ears integral with said arm, near its upper end, proximate the steering shaft 2, and projecting outwardly from the surface of the arm 4 so as to be in line with the valve control arm 10. The stop means are preferably adjustable by employing a screw 13 carried in one or both ears 12. These two spaced adjustable stops 13 provide a limited movement for the upper end of the valve control arm 10 and suitable adjustment thereof will limit or increase the relative motion of the arm 10 on arm 4. The adjustment screws 13 may also be used to lock the arm 8, 10 against movement relatively to arm 4 in an emergency, should the servo motor fail, by which to effectively steer by the hand wheel 11.

The upper end of the valve control arm 10 has a pivot 29 in axial alignment with the steering shaft 2, the purpose of which will be later described. The lower end 8 of the valve control lever arm 10 carries a bearing pin 15 and on the outer end of said pin is formed the conventional ball joint 16. The rear end of the drag link 7 has a conventional socket which is pivoted for universal motion on the ball joint 16. A power actuated drag link 17 has its front end pivoted on the bearing 15 adjacent the ball and socket joint 16, and its rear end is operatively connected to a suction or pressure-type servo motor means to be described. Hence the invention contemplates the use of the steering rods or drag linkage means 7, 17 and the power link 17 does not interfere with manual steering in the usual way in event the servo motor system fails. Should the latter occur, the driver can easily tighten up the stop screws 13 and rigidly anchor the two arms 10 and 4 together so that the lower end 8 merely becomes a fixed extension of the manually-operable arm 4.

Any suitable form of motor means may be used in this invention to drive or actuate the drag link means 7, 17 but there is shown an impeller vane or oscillating type of suction or fluid-pressure motor. The suction motor comprises a housing 19 anchored to the vehicle frame F and a shaft 20 is journaled in the housing with an end of the shaft projecting thru the housing. The upper end of a power-steering arm 21 is fixed on the shaft 20 and the lower end is pivotally connected at 22 with the power-actuated drag link 17.

The shaft 20 is anchored to one end of an impeller vane or piston plate 23, see Figure 3, and the edges of the plate 23 are fitted with any suitable type of fluid-pressure tight ring or packing gland means if required in this well known motor means. In order to effectively steer an automobile, the servo motor impeller 23 swings thru an arc of movement sufficiently to actuate the steering link 17 and other parts in a manner similar to the operation imparted thereto by the hand-steering wheel 11. The semi-turbine type of oscillating-vane motor 19 is shown merely as an example for actuating the steering mechanism and it is understood that other motor means may be employed.

An important feature of the invention resides in the suction-control valve means for governing the negative or suction flow of fluid pressure to or from the servo motor for actuating it. In the example of the invention shown, there is provided two suction-control valves 25 of the same construction which are connected to the motor housing 19 thru conduits 26 on each side of the impeller vane 23. A power line or motive fluid supply, such as a vacuum or suction supply pipe 27, is connected to the control means represented by the two valves 25 and the other end of the line 27 is adapted to be connected with a source of motivating energy, say the intake manifold of an internal combustion motor or to a suction pump for the purpose of creating a suction at or thru the valves 25 so as to actuate the impeller vane 23 and power arm 21, all of which is under the control of the hand-steering wheel 11 operating thru the valve control arm 10 and thru operative connections extending from said steering wheel 11 to said motive-fluid control valve or valves 25.

Each suction valve 25 is fitted with a pivoted lever means, say a bell crank 24, for actuating the inside valve parts. This suction-control valve 25 is shown in Figures 8 thru 13, but before describing its details reference will be made to the manual-actuating means under the control of the operator or the driver's steering wheel 11 employed to operate the two valves 25 on the servo motor 19.

The two valves 25 are opened and closed from the valve-control arm 10, and to this end a valve-control rod 28 has one end pivotally connected at 29 and the other end has arms 30 and 31 fixed thereto. The arm 30 is operatively connected by a pin with the lower end of one bell crank 24 and the other arm 31 is connected with the other bell crank 24 carried on the other valve 25. This arrangement permits the opening of one valve 25 while the other valve remains closed. For example, when the control rod 28 is shifted to the right, as viewed in Figure 5, the arm 31 opens the right valve 25 to Figure 9 position so that suction flows as indicated by the arrows and hence the power arm 21 swings counter clockwise. Although the left valve 25 is also actuated to the same extent, its setting is such that it is merely closed a little further than normal. In other words both suction valves 25 normally hold their suction-outlet ports closed and their atmospheric-inlet ports open as in Figure 8 position when the vehicle is headed straight which holds the motor 19 inactive. When arm 30 moves to the left, it follows that the left bell crank 24 opens the left valve 25 to communicate the suction supply pipe 27 with the left conduit 26 to evacuate the air from the left side of the motor 19, but the corresponding movement of arm 31 did no more than effect further closing of the right valve 25.

The upper end of the power-steering arm 21 is provided with a fork 35 in which the valve-control rod 28 freely moves. A washer or rest 36 is slidably mounted on the rod 28 on each side of and bearing against the fork 35. A compression spring 37 is confined on the rod 28 between the arm 30 and slidable rest 36; and likewise a spring 38 is placed between the arm 31 and the other slidable rest 36. The springs 37 and 38, among other things, serve to reverse the position of the two valves 25 and automatically restore the servo motor to normal straight-line steering position, as in Figure 1, should the operator release the hand steering wheel 11 while on a turn and provided the inertia of the car and castor angle of the ground wheels operate to return said wheels to normal straight-line travel. This function of the springs 37 or 38 is the result of over-compression of one spring or the other to operate one bell crank 24 or the other should the car driver let go of his steering wheel while on a turn; and as soon as the power arm 21 reaches vertical position, the springs 37 and 38 again equalize or balance each other with the result that the two valves 25 are again returned to their normally-closed position to stop the motor at its central or neutral position as in Figure 1.

Construction of valve 25

A description will now be given of the suction-control valve means 25 shown in Figures 3 thru 13 and this valve is provided with what may be called a feeling or reacting means which is sensitive to the negative or suction flow of a motive fluid to or from the motor means 19. The feeling means is an important feature and the control valve herein shown is merely one example which can be employed in connection with the invention. When the operator is turning the steering wheel 11 and shaft 6 to the right or left to steer the car, he feels a soft and yielding senselike resistance to his steering effort but this resistance is, of course, very much less than that normally encountered in manually steering an automobile in the conventional way.

The suction-control valve has a cylindrical housing 25 on which the bell crank or other lever means 24 is pivoted with the inner end of the bell crank disposed centrally in the upper open or air-inlet end of the housing 25. It may be noted here that the upper end of the housing 25 is open to atmosphere so that for energizing the vacuum or suction motor steering means, it follows that normal atmospheric pressure flows down thru the upper end of valve housing 25 and hence to the servo motor 19, or the atmospheric pressure is stopped against such flow to render the motor inactive, depending on whether the valve 25 has its suction-outlet port in open or closed position.

The lower end of the suction-valve housing 25 is closed by a cover 39 carrying a central and integral valve-port tube 41 projecting part-way thru the housing 25. The valve-port tube 41 is provided with an atmospheric-inlet port or ports 42. In the lower end of said tube 41 there is formed a suction-outlet or vacuum port or ports 43. The inner part of this tubular stationary valve member 41 is provided with a closure wall 44 located between the upper and lower ports 42 and 43, as seen in Figures 8 and 9. Also the valve-port tube 41 is made with oppositely disposed elongated slots 45 thru which a pin 46 slides up and down to carry a sleeve valve 47 over the tube 41 adapted to open and close the ports 42 and 43.

After the sleeve valve 47 is mounted over the tube 41, a ring cover 49 is secured in the position shown by screw fastening it or by other means with the view of forming an annular suction-tight air or dashpot chamber 55 between the cover 49 and a flange piston 52 and between the valve housing 25 and inner tube 41. This annular chamber 55 is variable in volume due to the movement of the piston 52 with the sleeve valve 47 in the housing 25. The chamber 55 and piston 52 act in a dashpot fashion to resist or retard upward movement of the sleeve valve 47 and its dashpot piston 52, and this mode of operation will be later described when explaining its feeling action impressed on the driver at the steering wheel 11.

A link 50 has its lower end pivoted on the pin 46 and is thus connected with the sleeve valve 47 and its upper end is pivoted at 51 on the inner end of the bell crank 24. The bell crank 24 actuates the sleeve valve 47 up and down on the valve-port tube 41 to open and close the ports 42 and 43. The upper end of the sleeve valve 47 is provided with the piston flange 52 already mentioned as having an air-tight sliding fit with the inner wall of the valve housing 25. A lower annular suction passage 48 is defined by the piston flange 52, the lower cover 39, the housing 25, and valve elements 41 and 47. This suction passage 48 is normally open to atmosphere only, as shown in Figure 8, but it is capable of being placed in communication only with the suction supply pipe 27 as shown in its other position, Figure 9.

The sleeve valve 47 normally stands with its lower edge just above the cover 39 so that sleeve 47 in one valve 25 may move downwardly when the corresponding sleeve 47 in the other valve moves up. An atmospheric cut-off port or ports 54 is formed in the sleeve valve 47 just under its piston flange 52 and so positioned that this port 54 normally registers with the atmospheric-inlet ports 42, as in Figure 8. One end of the conduit 26 connects to one side of the servo motor 19 and its other end connects with the valve passage 48. When the valve 25 has its operative parts in normal position open to atmosphere, as in Figure 8, the conduit 26 and one side of the servo motor is open to atmosphere thru the registered or aligned air inlet ports 54 and 42. If suction is now applied to the other side of the motor it is energized to actuate the power arm 21.

The dashpot chamber 55 is open to atmosphere thru a port 56 which is adjustable in size by a screw valve 57. By reference to the views Figures 8 and 9, it is seen that the chamber 55 varies in volume due to the up and down movement of the piston 52, which action expels or draws in air thru the variable-size port 56. Hence it is seen that the chamber 55 performs the function of an adjustable dashpot and that the resistance against the upward pull of the piston 52 to open the suction-outlet port 43 is variable by adjustment of the size of the port 56 by screw valve 57 to regulate the tension or suction pull on the valve 47 and its piston 52. By partially closing the screw valve 57, the manual effort required by an operator to open the valve 47 and lift piston 52 against the suction in passage 48 is increased because air is trapped and compressed in the chamber 55 to resist the upward movement of the piston 52. On the other hand, the unscrewing of the valve 57 to enlarge the port 56 makes it easier to lift the valve 47 to open the suction-outlet port 43 and close the air-inlet ports 42 because the air above the piston 52 readily escapes thru the port 56.

When the sleeve valve 47 is raised by the bell crank 24, as in Figure 9, by shifting the valve-control rod 28 to the right, the atmospheric-inlet ports 42 are closed since the ports 54 and 42 are no longer in registry, and the lower edge of sleeve valve 47 uncovers the suction-outlet ports 43. This valve action closes the right conduit 26 against the atmosphere which can no longer flow downwardly thru the tube 41; and the conduit 26 is connected directly to the suction pipe 27 thru the open suction-outlet ports 43. Thus the air is now evacuated from one conduit 26 and one side of the servo motor 19 into the pipe 27 and, as the other valve 25 remains open to atmosphere, it follows that atmospheric pressure flows into the other side of the servo motor to force against the impeller vane 23 which rotates the shaft 20 and thus swings the power-steering arm 21 to actuate the drag link 17 and hence the forward link 7 to turn the ground wheels of the vehicle.

*Complete operation of suction-steering system*

In the operation of the power-steering apparatus in Figures 1 thru 13 above described, the operator turns the steering wheel 11 to the left and, thru the worm means 3, 5, rocks the steering shaft 2 and gives the lower end of primary arm 4 a starting impulse clockwise about the rock shaft 2. The resistance against turning the ground wheels or other steering element of a vehicle, reacts thru the steering drag link 7 to tilt the secondary arm 8, 10 on the primary arm 4 thus moving the upper longer valve-control end 10 counter clockwise on its pivot 9 until it comes to rest against the forward stop 13 and thereby permitting the operator or automobile driver to manually steer by his own physical effort if the servo-motor control is out of order. However, the normal action of the secondary steering or control arm 10 is such that it draws the valve control rod 28 to the left, as in Figure 4, and starts the servo motor before the operator has to steer the car by hand. The motor 19 so quickly responds to the movement of the valve control arm 10 that the stop means 13 is lightly engaged if at all. Very slight movement of the steering arm 4 against the resistance of the drag link 7 is sufficient to tilt the arm 10 because of its greater length ratio as compared to the short arm portion 8, and thus is provided amplified movement of the valve means 25. This arrangement affords quick valve actuation when the steering wheel 11 is first turned which means accuracy and speed in steering.

When the valve-control arm 10 swings counter clockwise, the valve-control rod 28 is shifted to the left which opens the suction-outlet ports 43 of the left control valve 25 and simultaneously closes the atmospheric-inlet ports 42 thereof with the result that the left valve is now in Figure 9 position. Suction is, therefore, applied to the left side of the servo motor 19, and since the right valve 25 remains in its open position to atmosphere, Figure 8, it follows that atmospheric pressure flows thru the right valve 25 and conduit 26, building up pressure against the right side of impeller vane 23, and thereby swinging the power-steering arm 21 in a clockwise direction by which to steer to the left, being the direction originally taken by the steering wheel.

The driver should follow up the movement of the servo motor with his steering wheel 11 in order to keep the manual-steering arm 4 ahead or abreast of the movement of the drag link 17 to keep the valve control arm 10 close to the forward stop 13 in order to hold left valve 25 in its open suction position, or the driver should follow the resistance of the ground wheels to maintain resistance or back thrust in drag link 7 to keep the pivot 9 under the slight stress necessary to hold the top of arm 10 beyond its neutral position, as in Figure 4. If the operator should fail to follow-up or stop rotating the steering wheel 11 in order to continue an angular or turning movement of the vehicle, it is seen that the upper end of the valve control arm 10 will lag backwardly in clockwise direction on pivot 9 and thus close the left valve 25 with the result that the servo motor is stopped because the motive fluid suction is cut off. Therefore, the invention compels the operator to go through the well known steering motion to which he is accustomed but the only effort necessary on his part is to hold valve control arm 10 in operative position towards one of the stops 13, depending upon which direction he is steering.

Upon completing a turn with the vehicle, the operator may release his steering wheel and such release will cause the servo motor to automatically return, under and by power of the servo motor, to its normal position as in Figure 1 where the power-steering arm 21 is in vertical position, although this is only true in a strict sense for this form of the invention where the friction in the worm steering gear 3, 5 is not too great or it is of the reversible type. Such return by power takes place for the reason that, upon steering to the right or left, it is clear that the fork 35 on the upper end of power arm 21 compresses spring 37 or 38. For example, in steering to the right, as in Figure 5, the driver causes the upper end of arm 10 to shift to the right which slightly compresses spring 37, whereupon the right valve 25 opens its passage 48 to suction line 27, the motor now starts counter clockwise, the fork 35 moves to the left and compresses the spring 37 still more so than originally occurred when the operator turned the wheel 11 to the right, and this action tends to swing the left bell crank 24 clockwise to open left valve 25 to connect left pipe 26 with suction-supply line 27 and thus produce suction on the left side of servo motor to drive it back to neutral position. But the driver is holding against the spring 37 with the steering wheel 11 which maintains the right-hand steering direction as initiated. As soon as the operator releases the steering wheel, the over-compressed spring 37 will expand and shift the valve rod 28 to the left, as in Figure 1, and this action of spring 37 opens left valve 25 for suction and closes the right valve 25 against suction and thereby communicates it with atmosphere so that the servo motor returns to its normal and straight line travel position under its own power.

It is now seen that the compression of one spring or the other, 37 or 38, brought about by movement of the fork 35, automatically reverses the two valves 25 to connect one side or the other of the servo motor with the suction supply line 27, when the driver is not holding against said springs, and this condition obtains until the servo motor returns to neutral or vertical position, as in Figure 1. In other words, the inequality of compression between the two springs 37 and 38, causes the servo motor to operate itself until the compression is equal in both springs 37 and 38. It is of course understood that the springs 37 and 38 are comparatively light in that they do not exert any steering force thru the valve-control rod 28 and its related parts leading to the drag link 7. However, the springs 37 and 38 possess sufficient force to control or reset the valves 25 after the operator has released the steering wheel if the automobile is equipped with what is known as the reversible steering gear.

This steering apparatus also functions to counteract what is ordinarily known as shimmying of the ground-steering wheels of an automotive vehicle. Any tendency of the ground wheels to vibrate, shimmy or turn from a straight line, is automatically counteracted by the valve control and servo-motor means since the slightest tendency of the ground wheels to assume an angular position acts to tilt the valve-control arm 10 on its pivot 9 and thus open the proper valve 25 to energize the motor and thereby swing the power steering arm 21. This action immediately compresses one of the springs 36 or 37, which expands and thrusts back on the rod 28 and thus sets the valve means 25 to counteract said shimmy tendency by a power applied effort.

The manual-steering gear means 3, 5 shown in Figures 1 and 2 is diagrammatic and conventional, and it may be assumed to be reversible if the pitch or lead of the worm 5 is on a sufficient angle to rotate said worm when force is applied to the worm wheel 3 by the thrust of the drag link 7 caused by the return effort of the vehicle wheels trying to straighten out and come back to normal head-on position when the driver releases the steering wheel 11. Under these conditions, assuming a reversible worm, the servo-motor automatic valve control fork 35 and spring means 36, 37 will satisfactorily steer a car back by power to straight line travel. On the other hand if the work gearing 3, 5 is of the irreversible type and the friction of parts are too great, the automatic spring control 37, 38 cannot of course overcome the locked condition of the gearing 3, 5 and the driver would necessarily have to rotate the steering shaft 6 to satisfactorily steer the car back to a straight travel position.

Modified arm assembly in Figures 6 and 7

In the modified form of construction in Figures 6 and 7, there is shown a control means for resiliently holding the valve or valves 25 to a normal cut-off position. This construction comprises a self-centralizing arm assembly similar in some respects to the manual and valve-control arm assembly 4, 10 heretofore described, but a modification exists in respect to spring means 59 and 60 carried on the manual control arm 4 to keep the valve-control arm 10 in a neutral position half-way between the stops 13. This construction, when used alone, provides a resilient control to instantly reset a motor control valve to cut-off position and consequently deenergizes the motor immediately the driver discontinues his manual steering effort, and this is true irrespective of type, reversible or irreversible, steering gear means 3, 5 employed.

The two springs 59 and 60 bear against ears 61 integral with the arm 4. Spring retaining and thrust rods 62, provided with outer threaded ends for tension adjustment if desired, have nuts or heads 63 on their outer ends, and against which rest the outer ends of the centralizing springs 59 and 60. The two inner ends of the spring retaining rods 62 are pivoted on a pin 64 carried on the valve control arm 10. The outer ends of the centralizing springs 59 and 60 bear on the nuts 63 and hence against the valve arm 10, while the inner ends of the springs 59 and 60 seat against the manual arm 4. The tension of the springs 59 and 60 is variable by adjusting the nuts 63 in or out on the rods 62 to apply the desired centralizing force by which the arm 10 holds its normal position midway between the stops 13 to normally retain the motor control valves 25 to a cut-off or no power position or return the valves to that position after every steering operation. It is usually desirable to set the springs 59 and 60 under tension so that an elastic force holds arm 10 to its normal valve-cut-off position.

From the foregoing description of Figures 6 and 7, it is seen that if a driver releases the steering wheel 11, one or the other springs 59 or 60, whichever is compressed, will instantly centralize the valve control arm 10 and shift the rod 28 to reset the motor-valve means 25 to a no-power position. In this way the compressed spring acts to communicate both valves 25 to atmosphere and shut-off the flow of motive fluid or suction and the driver will therefore have to steer the car back to straight line travel unless a reversible steering worm means is employed. This modified control-arm assembly immediately deenergizes the servo motor 19 when the operator releases the wheel, even though the car is executing a turn.

The example of construction shown in Figures 6 and 7 is set forth to explain one of the principles of my invention, to show the breadth thereof and the provisions made for a variety of installations. This is a simple mechanism to maintain the servo motor de-energized so long as the car travels straight ahead and so long as the steering wheel 11 is not rotated, and has many advantages when used on an automobile which has an efficient self-turning or reversible steering means in its worm and pinion 3 and 5.

*Fluid-pressure operated steering system*

Figures 14 thru 20 illustrate the invention adapted to a motive fluid pressure, for example air, as differentiated from suction. In this connection there is shown the machine or vehicle frame F which carries a conventional manual-steering unit comprising steering wheel 66 adapted to rotate a steering shaft 67 through a worm and pinion or other suitable means 68. The arm assembly used here is of the type shown in Figures 6 and 7, but it is understood that other elastic or resilient means can be employed to normally maintain the motor-control valve or valves in cut-off position.

A manual-steering arm 69 has its upper end anchored to the steering shaft 67 and on its lower end there is provided a pivot 70 on which is swingably mounted the lower end of an upstanding valve-control arm 71. The pivot 70, it is noted, operatively connects the two arms 69 and 71 at their lower extremities. Immediately above the pivot 70, the valve-control arm 71 is provided with a bearing 72, similar to bearing 15 in former views, on which is mounted a power-actuated drag or steering link 73. A ball pivot 74, see Figure 15, corresponding to 16 in former views, is anchored on the outer end of the bearing 72 and a combination manual or power-actuated drag link 75 is pivoted on the ball 74. Either the steering wheel 66, a servo motor 86, or both of these instrumentalities, function to actuate the drag link 75 to steer the vehicle.

A pair of spaced stop ears 77 are formed integral with the manual-steering arm 69 and project outwardly from its surface; and the upper end of the valve control arm 71 is adapted to oscillate between the two ears 77 to control a valve means 93 for admitting and exhausting fluid pressure to and from a pressure-operated servo motor 86. One or both of the stops 77 is provided with an adjusting screw 78 so as to increase or decrease the distance through which the upper end of the valve control arm 71 may oscillate.

An ear 80 stands out from each edge of the arm 69 and a pair of rods 81 slide therein and are pivoted on a pin 82 anchored in the valve control arm 71. A compression spring 83 is mounted on each rod 81 between the fixed head 84 and the ears 80. When the valve-control arm 71 oscillates between the adjustable stops 78, the rods 81 slide through the ears 80 and compress one or the other of the springs 83 which tends to urge the valve control arm 71 back to a normally centralized position midway between the stop means 78.

Any suitable type of fluid pressure operated motor means may be used to drive the power-actuated link 73 back and forth to impart the necessary steering action to the ground wheels of a vehicle. In this instance there is again illustrated a simple type of semi-turbine or impeller vane motor comprising the housing 86 fixed to the vehicle frame F. A motor shaft 87 is journaled in the housing 86 and carries an impeller or turbine vane 88 fixed thereto. The vane 88 has a hub 89 which sets in a pressure tight bearing formed in the arcuate motor housing 86 and the outer edges of the vane 88 have packing means to form a movable pressure tight fit within the housing. A power steering arm 90 is anchored to one or the other end of the oscillatory motor shaft 87 which projects from the housing 86 and has its other end pivotally connected at 91 to the power drag link 73. In this manner the servo motor 86 is operatively connected through link 73 with the other link 75 to actuate the latter in the same way that said link 75 is ordinarily operated by the steering wheel 66.

The valve-control means for the pressure servo motor 86 will now be described, and in the present example of the invention there is employed two pressure valves 93 of the same form. Each valve 93 is connected by a conduit 94 to the motor housing 86 on each side of the piston or impeller vane 88. A fluid-pressure supply pipe 95 connects with the lower end of each valve housing 93 to supply a motive-fluid pressure to first one valve and then the other by which to oscillate the impeller vane 88 back and forth. The position of parts shown in Figure 14 is that assumed while making a left turn and the arrows indicate the direction of flow of the motive fluid while doing so. It is noted that the fluid pressure is flowing from supply pipe 95 thru the right valve 93, thus impressing a force against the right side of the impeller vane 88, swinging it clockwise; and that the left side of the motor housing 86 is exhausting to atmosphere thru the upper end of the left valve 93.

The two pressure-control valves 93 are actuated directly from the steering wheel 66 thru the agency of the valve-control arm 71 mounted on the manual-steering arm 69. To this end a link 97 has one end pivoted at 98 on the upper end of the arm 71 and its other end is pivoted at 99 on a link 100 interconnecting a pair of lever means 101 operatively carried on each pressure-control valve 93. In this example of the invention, a lost motion slot 102 may be formed in each end of the link 100 and a pin 103 is anchored in each lever means 101 and movably free in the slot 102. Thus is provided a lost motion connection, say a pin and slot means, between the steering wheel 66 and each pressure-control valve 93 so that motion of the wheel 66 and link 100 will operate only one lever means 101 and hence one valve 93 at a time while the other valve 93 is not actuated.

The pressure-control valve 93 is shown in detail in Figures 16 thru 20 and comprises a cylindrical housing 93 open, for example, at its upper end which is the exhaust end of the valve thru which one side of the motor 86 is also open to atmosphere. The valve is closed at the lower end by a cover or plug 105 carrying an upstanding valve-port tube 106. A pressure-inlet port or ports 107 are formed in the tube 106 and, when open as in Figure 17, permits the flow of fluid pressure from the pressure-supply pipe 95 to the inlet conduit 94 leading to one side of the servo motor. An exhaust port or ports 108 is also formed in the valve-port tube 106 and, when open as in Figure 16, vents or exhausts the servo motor 86 to atmosphere.

The upper end of the valve-port tube 106 is made with oppositely disposed slots 109 formed lengthwise in the tube and in which is slidably mounted a pin 110 fixed in a sleeve valve 111 which reciprocates over the tube 106. The sleeve valve 111 is provided with pressure-inlet cut-off ports 104 and exhaust cut-off ports 119 which register respectively with the pressure-inlet and exhaust ports 107 and 108 in the tube 106. The pin 110 projects thru the slot 109 and connects a link 112 with said sleeve 111, and the link 112 has its other end connected with the lever 101. In this way lever 101 is adapted to actuate the sleeve valve 111 up and down on the valve-port tube 106 to control the opening and closing of the several ports in the tube 106.

An annular piston 113 is formed on the lower end of the sleeve valve 111 and provides a positive pressure-responsive feeling means to characteristically inform the operator or vehicle driver, by sense of feel and reactance, of the steering function and this is an important feature of the invention. After placing the sleeve valve 111 over the ported tube 106, a ring cover 114 is fitted over the top open end of the tube 106 and within the valve housing 93 so as to form a closed upper pressure annular dashpot chamber and passage 115 to which the conduit 94 and hence the motor 86 is connected.

The dashpot and pressure-feeling piston 113 sets off a dashpot chamber 116 between it and the end cover 105 and it is noted that the chamber 116 is variable in volume as the piston 113 moves up and down by reason of movement imparted thereto by the lever means 101. When pressure is flowing thru pipe 95 into the annular valve chamber 115, the piston 113 is responsive to this pressure and tends or trys to move downwardly, as in Figure 16, against the force of the lever means 101 by which the operator at the driver's wheel 66 is holding the sleeve valve 111 and its piston in up position, as in Figure 17, and the dashpot chamber 116 is employed to variably resist the force with which the piston 113 tends to move toward the cover 105 and hence pull against the lever 101 and the operator of the steering apparatus. It is the pressure within the annular chamber 115 which the driver actually feels at the steering wheel 66 which signifies active pressure flow to the motor 86 and thus he is alert to the functioning of the entire steering apparatus.

To regulate the resistance of the dashpot means and hence the degree of feeling or sensitivity, an outlet port 117 is adapted to be adjustably opened and closed by a screw valve 118. By restricting the size of port 117, as in Figure 16, it follows that air is compressed in the dashpot chamber 116 to resist the down movement of piston 113 towards the valve cover 105, and thus weaken or lessen the feeling sense transmitted to the steering wheel 66. On the other hand the outlet 117 may be fully open, as in Figure 17, to allow rapid escape of air from dashpot chamber 116 so as not to oppose the downward movement of piston 113, the result of which is to cause the piston 113 to apply its full force against the lever means 101 and, consequently, exert its full force thru the links 97 and 100, as well as thru the valve-control arm 71 and hence to the steering wheel 66 whereby the driver actually feels the force of air pressure flowing to the servo motor.

*The arm assembly in general*

In illustrating the principles of my invention, there are shown two concrete examples of arm assemblies comprising a main or primary arm 4 and a secondary arm 10. The construction in Figures 1, 2, 4 and 5 shows one or the first form of the invention; that is Figures 6 and 7 being the second; and Figures 14 and 15 showing a third in that the connecting pivot 70 is at the extreme ends of the two primary and secondary or two cooperating arms 69 and 71. It is noteworthy that the stop means, whether using the adjustment screws 13 and 78 or the ears 12 and 77 therefor, very effectively protects the delicate control device or valve means 25 and 93 from the force exerted by the arm assembly. The stop means 12, 13 absorbs the road strain and the valves are not subject to wear and tear such as characterizes earlier described apparatus in the prior art.

Furthermore it is significant that the same stop means 12, 13 are employed for the additional purpose of adjusting the relative motion of the pivot 29 or 98, in that the distance of the back and forth movement of valve-control rods 28 and 97 is adjustable. This provision simplifies the manufacturing assembly operations in that a mechanic can rapidly adjust the stop means 13 and thus set the mechanism for desired valve movement and control. The short travel of pivot 29 over the shaft axis 2 can be regulated and permanently set once and for all to accomplish the exact travel needed for the sleeve valve 47 up and down on the valve-port tube 41.

A further function of the same adjustable stops 13 and 78 is to lock out the power-steering system, as heretofore mentioned, should the servo-motor means get out of order. This is quickly done by turning one or both screws 13 up against the secondary or valve control arm 10 to render it immovable on the main or primary steering arm 4. Other advantages are appreciated in the primary and secondary arms constituting the arm assembly.

While the stop means 12, 13 is shown on the primary arm 4, one readily appreciates that the stop for all its purposes may be otherwise suitably disposed; the object being to provide a positive stop, plain or adjustable, as a limiting agency for the free and longer end of the secondary steering arm 8, 10.

In the example of construction shown, the secondary-steering arm is at least as long or longer than the primary-steering arm, and usually the secondary arm is pivoted on the lower extremity, as at 9 or 79, of the primary arm. Hence the arm 10 has a bodily swinging movement in relation to the car frame F.

*Operation of the control valves 25 and 93 and their feeling function*

A driver of an automobile is accustomed to the feel of his vehicle in that the manual-steering effort is resisted to a certain extent by the friction and resistance offered by the ground wheels when steering the car. Inasmuch as this invention serves to relieve the driver of the labor involved in performing the steering effort, it might seem that the driver necessarily loses the sense and feel of his car but not so since this desirable function is retained by the action of piston 52 and dashpot chamber 55 in the suction control valve 25 and also the piston 113 and dashpot means 116 in the pressure-control valve 93. The force of this feeling action is susceptible to variation by reason of the dashpot control-screw valves 57 and 118 in the two types of control valves 25 and 93.

The suction piston 52 or pressure piston 113 in the two types of valves are operatively connected to the hand or manual-steering wheels 11 and 66. When a motive fluid, either vacuum or pressure, is applied to the servo motor, it follows that a yielding elastic force exists in the annular suction passage 48 or 115 to urge piston 52 or 113 downwardly and this force is transmitted thru the operative connections to the steering wheel. Consequently this elastic force is impressed upon the operator with the result that he senses and actually feels the air pressure flowing or applied to the servo motor. This mode of operation gives the driver the same control and feel of a power-steered car as exists in a manually-steered car, but he is not fatigued because the labor of swinging the ground wheels against the road surface is removed from the driver.

The sense and feel of the power-steering function, the intensity or force thereof, transmitted to the hand of a driver, in the suction or pressure apparatus, is capable of being regulated by the dashpot adjustment means 57 or 118. In fact the reaction from the valve feeling means may be reduced to a minimum so that the operator may become accustomed to a very slight feeling force imparted to the steering wheel as he rotates the wheel to the right or left in ordinary driving of his car. This feeling force, exerted by either control valve 25 or 93, is in substantially reduced proportion to the steering force exerted by one or the other servo motors 19 or 86 inasmuch as it is not intended that the driver be unduly resisted by the combination feeler or sensing dashpot and motor means to the same degree as accustomed in manual steering, but it is intended that the feeling resistance be adjusted to the type and capacity of car equipped with the invention. For heavy or large size vehicles, as trucks, busses and the like, it may be desirable to open or adjust the dashpot means 58 or 118 to transmit a more powerful feeling sense of pneumatic steering action to the steering wheel, than would be the case with light passenger cars.

*The stop 40 and automatic control of valve 25 in Figure 1 for power return*

Special reference is now made to the automatic control of the valve means 25 or 93 by which the servo motor is energized to swivel the guiding wheels of a vehicle back to straight-ahead position in event the operator releases the hand control or steering wheel 11. In parking, backing, and much constant short turning, when maneuvering an automobile in close places, this invention is highly advantageous in its automatic-power return of the steering wheel 11 and ground wheels of the car to neutral position.

Referring to Figure 1 merely as an example, a preferred feature, in addition to that already described in connection with the springs 37 and 38, resides in the stop means 40 which comprises any suitable stationary member against which seats each spring-rest device 36 when the servo motor is in neutral position. Each washer or sleeve rest 36 bears against the fork 35 and its respective stop 40 to hold the valve means 25 to cut-off position. The fork 35 therefore occupies what may be called a dead-center position between the springs 37 and 38.

When the fork 35 swings to the left, it follows that the spring 37 is rapidly compressed and spring 38 cannot follow the fork 35 because the right-hand sleeve stop 36 is at rest against the stop 40. Hence the characteristics of the left compressed spring 37 is in no way modified, and its expansive force acts instantly to shift the rod 28 back to the left and thereby reverse the positions of both valves 25 by which to energize the servo motor in the other direction, when the operator releases the steering wheel 11, assuming of course that the gearing 3, 5 is of the reversible type so that the steering wheel will turn in the reverse direction under the pull of the servo motor.

Special provision is made to cause the flanged sleeves or spring rests 36 to simultaneously bear on their respective slidable stops 36 and their fixed stops 40. In this way, the maximum expansive force of each spring 37 and 38 is available to hold the valve-control rod 28, hence the valve means 25, to a positive dead center and neutral cut-off position. The servo motor resists greatly any effort of the vehicle-ground wheels to take an angular direction. The slightest back thrust thru the drag-link means 7, 17 due to the front wheels of an automobile trying to go off a straight course, is forcefully resisted by all the power of the servo motor. This is true inasmuch as the drag link 7 acts on the valve-control arm 10 when the ground wheels try to deviate from a straight course and thus the valve rod 28 is shifted in the proper direction to set the valve means 25 to energize the servo motor 19 and actuate it in the proper direction to resist the ground wheel deviation. In other words the servo motor thrusts on the power drag link 17 in a direction reverse to the back thrust of the link 7. Means is therefore provided, in this invention, to resist the vehicle-ground wheels in their misguided direction should they strike something on the road, or in running on rough ground, or in case one front tire loses its air.

The mode of operation described in the next above paragraph is accentuated and the valve means 25 are seen to be highly sensitive in the performance of their duty, to resist any tendency of the drag-link means 7, 17 to displace the power arm 21. It is preferred that the springs 37 and 38 be set in position, as in Figure 1, under noticeable compression. The presence of the stop means 40 enables the manufacturer to use very substantially compressed springs, though soft and yielding as they are, when the apparatus is assembled. Therefore the spring 37 or 38 instantly acts on the rod 28, upon the slightest movement of the fork 35 and no movement is lost in compressing said spring. When assembled, the spring is already compressed enough to instantly shift the rod 28 and reset the valves 25 upon the slightest tendency of the flanged sleeve 36 to leave its stop 40.

The spring or elastic means 37, 38 also performs the highly important function of keeping all lost motion out of the operating connections and continuously eliminates lost motion which may gradually accumulate in the linkage means throughout the system by reason of wear in the bearings and pin connections. The springs 37, 38 therefore steady all parts, holding them taut, and making the operating connections highly sensitive and responsive to the slightest movement of the steering wheel 11 and to the slightest tendency of any misguided effort of the road wheels to displace the servo motor from its neutral position.

*Amplified valve control*

As noted in Figures 1 and 14, the upper and longer end 10 or 71 of the auxiliary-steering arm imparts a rapid shifting motion to the valve control rod 28 or 100 in response to a relatively short movement of the steering wheel 11 or in response to a deviation of the vehicle-guiding means (the front wheel of an automobile) to which the drag link 7 is adapted to be operatively connected. In other words, the movement of the valve 25 or 93 is somewhat multiplied over the movement of the steering wheel or drag link 7. The similar examples of construction shown in Figures 1 and 14 merely show the principle of this invention having to do with amplifying or multiplying the valve movement over the original movement of the steering wheel 11 or drag link 7 and it is, therefore, understood that other forms of construction may be amplified.

The foregoing arrangement provides a very sensitive and quickly responsive control of the servo motor so that the slightest movement initiated by the driver of an automobile or the slightest tendency of the vehicle-guiding means, such as the ground wheels of a motor vehicle, to deviate from a straight course, will cause instant and full movement of the valve means 25 by which to quickly energize the servo motor in the proper direction.

In providing an amplified valve movement, by which the valve sleeve 47 moves up and down on the valve port tube 41, it is noted that the sleeve 47 has a considerable travel in relation to said tube 41 and this is brought about by the leverage ratio provided in any suitable manner as, for example, by providing a suitable long length in one arm of the bell crank means 24 or in the valve control arm 10 or 71 whereby this quick and long stroke valve movement is attained over a short movement of the steering wheel 11 or drag link 7.

Furthermore, it is important to note that a valve means is specially provided which always operates with minimum friction and in which the flow of a motive fluid, either pressure or vacuum, does not bear or press on the movable elements of the valve to create friction between the sliding surfaces thereof. In other words, the special cylindrical type sleeve valve herein provided is operative within the air stream of the fluid pressure, being unbound therein because it may be said that the pressure is equalized on both sides of the movable valve element. This is more particularly due to the fact that the sleeve 47 is cylindrical and rides on a cylindrical valve seat 41, so to speak, and hence no amount of fluid pressure can bind the sleeve 47 to its seat 41 irrespective of whether the fluid pressure is or is not equalized on both the inside and outside of the sleeve 47. A valve of this type is free of and not bound or subject to friction by fluid pressure. Hence the high speed movement of the valve is not retarded in a manner which characterizes other types of valves subjected to sliding friction where the air pressure or suction forces the valve against its seat. Since the movable valve element is perfectly free of all suction or pressure forces, it is clearly seen that an accurately gaged and free movement of the valve enables it to stop and start without restraint. Thus a valve is provided which will not override or overrun the port or ports and this contributes to smoothness and accuracy in operation of the valve whether initiated from the steering wheel under manual control of a driver or from the drag link 7 which transmits motion from the front wheels of an automobile back to the valve means in automatically correcting any and all misguided tendencies of the ground wheel to veer or deviate from a straight course.

The invention is believed to fill a want felt for a rugged, high speed, responsive power and manual steering to actuate the guiding means of a vehicle and apparatus applicable to motor-driven road vehicles, and this is especially true in maneuvering an automobile in close places, as in parking, backing and turning, where a great deal of steering wheel and ground wheel actuation is necessary.

What is claimed is:

1. Combination power and manual steering apparatus comprising a hand control, and transmission means operated thereby to actuate a vehicle-guiding means, including an arm assembly operated by the transmission means and embodying a primary arm and a secondary arm pivotally mounted on said primary arm, said arm assembly adapted to be operatively connected with the vehicle-guiding means, a servo motor and control device therefor also adapted to be operatively connected with the vehicle-guiding means, an operating connection between the arm assembly and the control device, and adjustable-stop means cooperating with the arm assembly by which to vary or adjust the relative movement between the two arms or to rigidly lock the two arms together against such relative movement.

2. A power and manual-steering means in combination, comprising a rock shaft, a manually-operable steering wheel to oscillate the rock shaft, a short arm fixed to and depending from the rock shaft, lever means somewhat longer than the short arm and pivoted on the lower end of the short arm and having a short-auxiliary steering arm projecting below the pivot with a long valve-control arm projecting above the pivot, a drag-link means adapted to be pivoted on the lower extremity of the short-auxiliary steering arm below the short arm, a valve-operating rod connected with the upper end of the long valve-control arm, a servo motor and valve means connected with the valve-operating rod, and adjustable stop means cooperating with the short arm and lever means by which to adjust the relative movement therebetween or to rigidly lock the arm and lever means together for movement in unison.

3. Manual and power-steering apparatus in combination adapted to be carried on a vehicle frame, a rock shaft carried by the frame and a manual-steering wheel to oscillate the shaft, a manual-steering arm having its upper end fixed to the rock shaft by which an operator manually swings the lower end of the arm back and forth to effect manual-steering operations, motor means and a control valve therefor adapted to be connected with a vehicle-guiding means to effect power-steering operations, a valve-control arm pivotally mounted on the lower end of the manual-steering arm and adapted to swing bodily with said arm in relation to the vehicle frame, said valve-control arm adapted to be connected with vehicle-guiding means, an operating connection between the valve-control arm and the control valve of the motor means, a pair of rigidly spaced stop means carried on one of the arms between which the other arm moves freely to actuate the control valve, and means connecting said vehicle-guiding means and control valve independently of said valve control arm, said connecting means including resilient means compressible by movement of said vehicle-guiding means in either direction from central position.

4. Power-steering apparatus in combination with vehicle-guiding means and a fluid operated servo motor operatively connected with the latter, a control valve means to initiate and interrupt flow of fluid to the servo motor, an operator's control member to actuate the control means by a driver of the vehicle, feeling means comprising a pressure responsive element incorporated within the control valve means and subject to the pressure of the fluid conducted to the servo motor, an operating connection between the feeling means and the operator's control member, and adjustment means to regulate the intensity of the force of said feeling means transmitted to the operator's control member.

5. Power-steering apparatus in combination with vehicle-guiding means and a servo motor operatively connected with the latter, a valve housing having a fluid chamber with ports in communication with the servo motor, a valve element movable in the chamber to open and close the ports, a pressure-responsive piston slidable in the chamber and reacting to the pressure flowing thru the chamber to and from the servo motor, the valve element and piston being integrally formed, and a driver's control member operatively connected with the valve, said piston reacting against the driver's control member to transmit thereto a sense and feel of the operating characteristics of the valve and servo motor.

6. Power-steering apparatus in combination with vehicle means to be guided and a servo motor operatively connected with the latter, a motive-fluid supply line and valve means for the servo motor, a feeling means in the supply line sensitive to the force of motive-fluid energy applied to the servo motor, manual means to actuate the valve means, an operating connection between the feeling means and the manual means thru which a driver feels the steering action of the servo motor, and means operating independently of the manual means to energize the servo motor in a direction opposite to that which the vehicle means tends to take when the latter tries to deviate from a straight course.

7. Power-steering apparatus in combination with vehicle means to be guided and a servo motor operatively connected with the latter, a motive-fluid supply line and valve means for the servo motor, a feeling-dashpot means movable within the valve means and responsively sensitive to the force of motive-fluid energy applied to the servo motor, manual means to actuate the valve means to start the servo motor, an operating connection between the feeling-dashpot means and the manual means by which the latter is yieldingly resisted when actuating the valve means, and control instrumentalities sensitive to the tendency of the vehicle means to deviate from a straight course by which to counteract said tendency.

8. Power-steering apparatus comprising a servo motor, a valve connected therewith including a housing forming a fluid passage, ports formed in the housing, a sleeve valve operable to open and close the ports, a piston carried by the valve and slidable in the chamber and being responsive to the flow of pressure thru the passage, a manual-control member operatively connected with the sleeve in the valve and the piston whereby an operator actuates the valve and feels the pressure build up in the servo motor, an operating connection between the servo motor and a vehicle-guiding means, an operating connection between the vehicle-guiding means and the valve whereby any deviation of said vehicle-guiding means acts to set the valve to energize the motor to correct said deviation, and resilient means cooperating with the last named operating connection.

9. A power and manual-steering apparatus comprising, a hand control, a rock shaft carried in a frame bearing and actuated by the hand control, a depending primary-steering arm having its upper end fixed on said rock shaft and its lower end adapted to swing back and forth, a secondary-steering arm pivoted on the lower end of the primary arm and swingable back and forth therewith and adapted to connect with a vehicle-guiding means, valve means operatively connected with the secondary arm, a servo motor under the control of the valve means, and resilient means cooperating with the valve means to urge same to a normal or neutral cut-off position to maintain the servo motor deenergized in a straight-line driving position and to energize the servo motor in a reverse direction and return same to such latter position should the hand control be released when the vehicle-guiding means is not in such position.

10. Combination power and manual-steering apparatus comprising a rock shaft, means by which an operator actuates the rock shaft, an arm depending from the rock shaft, a steering lever pivotally carried on the lower end of the arm, said steering lever having a short lower end projecting below the pivot and beyond the lower end of the arm and said short end adapted to be connected with a vehicle-guiding means, said steering lever having an upper long end reaching to the rock shaft, stop means correlated with the arm and steering lever to limit the relative motion of the arm on the lever, said stop means being located below the rock shaft, a servo motor also adapted to be connected with the vehicle-guiding means, a control device and motive energy line connected with the servo motor, an operating link between the control device and long end of the steering lever, and resilient means cooperating with the control device to urge and maintain it in a neutral cut-off position and cooperating with the vehicle-guiding means when moved away from straight-line driving position to return said servo motor and said vehicle-guiding means to straight-line driving position upon release of the operator means aforesaid.

11. A power and manual-steering apparatus comprising a hand control, a rock shaft carried in a frame bearing and operated by the hand control, a depending primary-steering arm having its upper end fixed on said rock shaft and its lower end adapted to swing back and forth, a secondary-steering arm pivoted on the lower end of the primary arm and swingable back and forth therewith and adapted to connect with a vehicle-guiding means, valve means operatively connected with the secondary arm, a servo motor under the control of the valve means, and resilient means operatively connected with the valve means to urge same to a cut-off position and hence maintain the servo motor deenergized and operatively connected with the vehicle-guiding means when moved away from straight-line driving position to also energize the motor in a reverse direction and restore the apparatus to a straight-line driving position.

12. In a power steering mechanism for motor vehicles, a manually-operable shaft, a steering arm, a fluid motor operatively connected to said steering arm, means including a pair of pivotally-connected members for connecting said shaft and arm, and valve means operable in response to relative pivotal movement of one of said members with respect to the other for controlling the flow of fluid under pressure to said motor, said valve means including a pressure-responsive element subjected to the pressure of the fluid conducted to said motor and thereby offering a resistance to said relative pivotal movement in a degree proportional to the power required for steering.

13. In a power steering apparatus for motor vehicles having a manually-operable steering shaft, an oscillatable lever having one end thereof connected with said shaft, a power device, a controlling valve mechanism therefor, the other end of said lever being connected with said valve mechanism, a movable steering member connected with said power device and adapted to be operated by the latter upon operation of said valve mechanism, a fulcrum carried by said member for mounting said oscillatable lever intermediate the ends thereof, and means associated with the end of said oscillatable lever connected with the valve mechanism for limiting the oscillatable movement of said lever about said fulcrum.

14. Power steering apparatus for motor vehicles comprising a vehicle steering member, means for operating said member by power including a motor having a movable power-operated element connected with said member, valve means for controlling the passage of motive fluid to and from said motor, a valve-operating lever pivotally mounted intermediate the ends thereof on said vehicle steering member, one end of said lever being connected with said valve means to operate the latter during relative pivotal movement between said lever and member, the other end of said lever being adapted to be manually actuated to effect such pivotal movement of said lever with respect to said member, means positioned adjacent the first named end of said lever for limiting the extent of said relative pivotal movement, and a pressure-responsive element associated with said valve means and subjected to the pressure of the fluid conducted to said motor and thereby offering a resistance to said relative pivotal movement in a degree proportional to the power required to operate said vehicle steering member.

15. Power-operated steering apparatus for motor vehicles comprising a movable member, a servo motor having a power-operated member operatively connected with said first member to effect movement of the latter, valve means for controlling the admission and exhaust of power fluid to and from said servo motor, means for controlling said valve means comprising a manually-operable lever pivotally mounted intermediate its ends on said first member, means for connecting one end of said manually-operable lever to said valve means, means associated with said last named end for positively limiting the extent of pivotal movement of said manually-operable lever with respect to said arm, and means including a pressure-responsive element associated with said valve means, connected with said connecting means and subject to the pressure of the power fluid supplied said servo motor when said valve means is operated in response to relative pivotal movement of the manually-operable lever with respect to said first member, said pressure-responsive element thereby offering a resistance to said relative pivotal movement in a degree proportional to the power required to operate said movable member.

16. Power-operated steering apparatus in combination with a vehicle steering element and a servo motor operatively connected thereto, a valve housing having a fluid chamber provided with a port in communication with the servo motor, a valve element movable in the chamber to open and close the port, to control the flow of fluid under pressure to said motor, a pressure-responsive piston slidable in the chamber and reacting to the pressure flowing through the chamber to and from the servo motor, the valve element and piston being operatively connected, and an operator's control member operatively connected with the valve and piston, said piston reacting against the operator's control member to transmit thereto a sense and feel of the operating characteristics of the valve and servo motor.

ROBERT C. RUSSELL.